US010531246B2

(12) United States Patent
Sivakkolundhu et al.

(10) Patent No.: US 10,531,246 B2
(45) Date of Patent: Jan. 7, 2020

(54) METHOD FOR SENDING TARGETED SMS MESSAGES TO A ROAMING USER

(71) Applicant: Syniverse Technologies, LLC, Tampa, FL (US)

(72) Inventors: Prem Sivakkolundhu, Tampa, FL (US); Kishore Korimilli, Sanford, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/424,552

(22) Filed: May 29, 2019

(65) Prior Publication Data

US 2019/0373420 A1   Dec. 5, 2019

Related U.S. Application Data

(60) Provisional application No. 62/677,877, filed on May 30, 2018.

(51) Int. Cl.
*H04W 4/14* (2009.01)
*H04W 8/06* (2009.01)
(Continued)

(52) U.S. Cl.
CPC .......... *H04W 4/14* (2013.01); *G06Q 30/0261* (2013.01); *G06Q 30/0269* (2013.01);
(Continued)

(58) Field of Classification Search
CPC ........ H04W 8/12; H04W 8/06; H04W 88/16; H04W 60/00; H04W 8/04; H04W 12/06; H04W 4/14; H04W 88/18; H04W 8/02; H04W 8/08; H04W 36/14; H04W 48/18; H04W 76/12; H04W 92/02; H04W 76/10; H04W 36/0022; H04W 60/04; H04W 84/042; H04W 4/12; H04W 88/06; H04W 36/0033; H04W 8/20; H04W 8/24; H04W 84/045; H04W 92/24; H04W 28/12; H04W 36/0016; H04W 4/029; H04W 84/005;
(Continued)

(56) References Cited

U.S. PATENT DOCUMENTS

8,423,003 B2 * 4/2013 Sarukkai ................ G06Q 30/02
  455/414.1
9,497,795 B1 * 11/2016 Billman ................. G06F 16/951
(Continued)

*Primary Examiner* — Nimesh Patel
(74) *Attorney, Agent, or Firm* — Anton J. Hopen; Smith & Hopen, P.A.

(57) ABSTRACT

A method of sending a targeted SMS message to a roamer. A messaging platform accesses signaling traffic between the roamer's user equipment, a visited network operator, and a home network operator. The messaging platform obtains the roamer's current location from the signaling traffic with the visited network operator and extracts demographic information associated with the roamer from data received from the home network operator. The messaging platform queries a messaging database for prestored messages corresponding to the roamer's current location. The messages corresponding to the roamer's current location are filtered based on the roamer's demographic information to identify the targeted message for the roamer, which is then transmitted to the roamer's user equipment.

9 Claims, 10 Drawing Sheets

(51) Int. Cl.
*H04W 4/029* (2018.01)
*H04L 29/08* (2006.01)
*G06Q 30/02* (2012.01)

(52) U.S. Cl.
CPC .............. *H04L 67/24* (2013.01); *H04L 67/26* (2013.01); *H04W 4/029* (2018.02); *H04W 8/06* (2013.01)

(58) Field of Classification Search
CPC ..... H04W 8/265; H04W 92/06; H04W 92/16; H04W 4/50; H04W 8/18; H04W 84/12; H04W 12/0017; H04W 28/0215; H04W 72/0453; H04W 4/60; H04W 4/00; H04W 4/02; H04W 4/025; H04W 68/12; H04W 80/00; H04W 88/12; H04W 92/04; H04W 16/32; H04L 65/1016; H04L 65/1073; H04L 65/103; H04L 65/1069; H04L 51/38; H04L 65/1006; H04L 2209/80; H04L 12/1407; H04L 63/162; H04L 63/166; H04L 12/1442; H04L 12/4641; H04L 29/12188; H04L 45/742; H04L 61/1588; H04L 63/08; H04L 65/104; H04L 65/105; H04L 65/4069; H04L 29/06952; H04L 29/12367; H04L 29/12905; H04L 61/6054; H04L 65/1033; H04L 9/0844; H04L 67/306; H04L 47/20; H04L 47/2408; H04L 47/14; H04L 67/24; H04L 69/08; H04L 29/06027; H04L 67/04; H04L 69/18; H04L 61/605; H04M 15/8038; H04M 2207/18; H04M 15/8033; H04M 2215/2026; H04M 2215/204; H04M 2215/32; H04M 2215/34; H04M 2215/52; H04M 2215/782; H04M 15/90; H04M 2207/12; H04M 3/42; H04M 3/42382; H04M 7/0042; H04M 2242/15; H04M 7/00; H04M 7/006; H04M 15/745; H04M 15/66; H04M 15/75; H04M 2215/0108; H04M 2242/30; H04M 3/42348; H04M 3/42365; H04M 7/126; H04M 15/55; H04M 2215/2046; H04M 2215/2053; H04M 2215/7442; H04M 3/4878; G06Q 20/40; G06Q 10/06375; G06Q 30/0207; G06Q 30/0241; G06Q 30/0284; G06Q 10/109; G06Q 30/02; G06F 15/177; G06F 3/0482; G06F 16/29; Y02D 70/00; Y02D 70/122; Y02D 70/1226; Y02D 70/124; Y02D 70/1262; Y02D 70/142; Y02D 70/144; Y02D 70/146; Y02D 70/164; Y02D 70/22; Y02D 70/23

See application file for complete search history.

(56) References Cited

U.S. PATENT DOCUMENTS

| | | | |
|---|---|---|---|
| 2002/0061745 A1* | 5/2002 | Ahn | H04W 8/04 455/432.2 |
| 2004/0235455 A1* | 11/2004 | Jiang | G01V 3/087 455/411 |
| 2008/0176597 A1* | 7/2008 | Bantukul | H04W 8/12 455/552.1 |
| 2008/0287150 A1* | 11/2008 | Jiang | G06Q 30/0277 455/466 |
| 2010/0278122 A1* | 11/2010 | Singh | H04L 69/16 370/329 |
| 2013/0276062 A1* | 10/2013 | Sarawat | H04W 4/18 726/3 |
| 2015/0382263 A1* | 12/2015 | Jain | H04W 76/10 455/432.1 |
| 2018/0035281 A1* | 2/2018 | Erginler | H04M 15/85 |

* cited by examiner

METHOD FOR SENDING TARGETED SMS
MESSAGES TO A ROAMING USER

BACKGROUND OF THE INVENTION

1. Field of the Invention

This invention relates generally to the field of telecommunication networks. More specifically, it relates to a method of sending targeted Short Messaging System (SMS) messages to a roaming user equipment based on the roamer's demographic data extracted from data obtained from the home network and the roamer's current location obtained from the visited network.

2. Brief Description of the Related Art

Location-based advertisements and targeted messages constitute an important aspect of modern telecommunications. Advertising entities such as FACEBOOK, GOOGLE, and YELP commonly access a mobile user's GPS coordinates to push targeted advertisements corresponding to the user's current location. For example, when the user is in a particular city, various apps installed on a user's smartphone will push advertisements for restaurants or hotels in that geographic area. In order to push these messages to the user, the application services require an active data connection. This requirement constitutes a major limitation for targeted advertisement to roaming users because many such users turn off roaming data on their smartphones to avoid roaming charges.

International roamers are particularly cautious when using their data plan while roaming and often turn off roaming data. Even if data roaming is enabled, many roamers are cautious of data usage and may individually turn off high-data consumption applications, such as GOOGLE MAPS. This poses unique challenges to over-the-top ("OTT") advertisement platforms as they cannot collect customer data in real time. Thus, what is needed is a method of identifying user's current location and sending targeted messages based on user's demographic information via communication means that do not require data services.

3. SUMMARY OF THE INVENTION

An embodiment of the invention includes a method of sending a targeted SMS message to a silent roamer. A silent roamer is someone maintaining an active cellular connection but has turned data services off. This means the roamer can receive voice calls and SMS text messages but cannot use OTT IP-based applications such as FACEBOOK or SNAPCHAT. Silent roamers are often international travelers or subscribers with limited data plans. Particularly, for the international travelers, phone calls and text messages are relatively easy to monitor. However, OTT applications may be "chatty" in the background and use substantial amounts of data which can incur unexpected costs to the subscriber.

The method includes the step of accessing signaling traffic between the roaming user's mobile equipment, a visited network operator and a home network operator. The roamer's current location is obtained from the signaling traffic with the visited network operator. In addition, demographic information associated with the roamer is retrieved from the home network operator. At minimum, this will include the country of origin and the carrier. The home network carrier may also expose further details and preferences of the roaming users is desired. Such additional data may be retrieved using a data exchange such as a web service and may include age, gender, income, marriage status, children, profession, language fluency, travel itinerary, shopping preferences, communications preferences, and travel interests.

While the silent roamer cannot receive OTT messaging, they can receive SMS messages. These messages are typically limited to 160 characters in length, but multiple SMS messages may be chained together. Using an example of an international traveler, at least three points or arrays of data are now available: (1) the roamer has data turned off; (2) the roamer's geographic location; and (3) the roamer's country of origin. From these three points of information we know the roamer is unlikely to have GPS services so providing information on nearby attractions or services may be pertinent. We also can make assumptions as to the native language spoken and therefore convey information in that language and/or offer service providers with fluency in that language. We can further assume that there may be some cost concerns as to roaming data charges so that offering low-cost data services or free wireless connections may be a commercial draw to the roaming user.

As additional data is made available or extrapolated, the quality of the targeted messaging to the roaming user improves. In this embodiment of the invention, a connection with a messaging database containing prestored messages is established and the database is queried for prestored messages corresponding to the roamer's current location. From that query, prestored messages returned are additionally filtered based on the roamer's demographic information to identify a targeted message for the roamer which is transmitted to the roamer's user equipment via SMS.

The signaling traffic with the visited network operator may be derived from the roamer's current location by multilateration, triangulation or advanced forward link trilateration. The demographic information derived from the roamer's home network may include data values such as primary language spoken, country of origin, and region of origin. The targeted message may be a third-party advertisement for products and services offered within a predetermined proximity to the roamer's current location. The proximity value may be variable depending on the speed in which the roaming user is moving between towers. This may associated with travel by train, car or on foot. For example, if the cell-to-cell transitions show roamer movement of 30 miles per hour it is safe to assume they are in a car or on a train (and not on foot). Therefore, the proximity value for a pertinent third-party advertising message may be five miles or ten minutes at 30 miles per hour. However, if the cell-to-cell transition shows the roaming user moving at 3 miles per hour it is likely they are traveling on foot. Therefore, the proximity value for a pertinent third-party advertising message may be 0.5 miles (10 minutes).

$$X_{mile\,radius} = Y_{minutes}\left(\frac{Z_{mph}}{60}\right)$$

An embodiment of the invention employs an SMS accessibility window that ranges between 2 and 20 minutes. Solving for a 2-minute accessibility radius, the formula is:

$$X_{mile\,radius} = 2_{minutes}\left(\frac{Z_{mph}}{60}\right)$$

For example, at 60 miles per hour in a vehicle, the SMS accessibility radius would be 2 miles. At a walking pace of 3 miles per hour, the SMS accessibility radius would be 0.1 miles. For a 20-minute accessibility window:

$$X_{mile\,radius} = 20_{minutes}\left(\frac{Z_{mph}}{60}\right)$$

At 15 miles per hour which could be on a bicycle or electric scooter, the SMS accessibility radius for 20 minutes would be 5 miles.

An embodiment of the invention anticipates third-party targeted advertising to have higher value based on the potential immediacy of the roaming user engaging with the advertising vendor. Therefore, targeted SMS messages may be charged at variable rates based on not only fixed geographic proximity between vendor and roamer, but also an accessibility radius based on extrapolated speed of the roamer from signaling data and location of cell towers over time.

In one embodiment of the invention, the per-message charge for targeted SMS delivery is inversely proportional to the distance between the advertiser location and the location of the roaming user. For example, if a base value for targeted SMS delivery was $1.00 at 1 mile from the advertising entity location, then a targeted SMS delivery at 0.5 miles would cost $2.00 and at 0.25 miles away would be $4.00. The scope of the invention includes both linear scales of incrementing cost as well at those at variable scales (e.g., partially inverse). A partially inverse rate to distance would mean that the increasing rate with proximity might be mitigated algorithmically or by threshold cap as a roaming user standing outside the door of the advertising entity would not incur a drastic increase in targeted message cost.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

The messaging platform according to the present invention enables advertisers to reach their target audience even if the roamer has disabled roaming data. International roamers constitute an attractive audience for various advertisers because these roamers are often unfamiliar with their current location and are eager to follow suggestions about places to visit, events to attend, restaurants to try, products to buy, etc. However, when these roamers disable their roaming data services they become "silent roamers," invisible to advertising platforms such as GOOGLE. International roamers are particularly cautious of using their data plan and most of the silent roamers will turn off data roaming services to avoid roaming charges. Even if the roamer does not disable the roaming data services altogether, the roamer may be cautious of data usage and may turn off high-data consumption apps, such as GOOGLE MAPS. This poses challenges to over-the-page ("OTP") advertisement platform leaders like GOOGLE because they cannot collect customer data in real time.

Although international roamers often turn off roaming data services, they frequently do not turn off their voice and SMS services because those services tend to be inexpensive and are perceived as a necessity for basic communications. Hence, the messaging platform according to the present invention provides a unique opportunity to mobile operators to reach the roamer customer base via SMS messages, without requiring an active roaming data connection, thereby generating additional revenue through advertisements. For mobile operators, the messaging platform also presents an opportunity to boost the roaming revenue by providing more customized offers, which may entice the silent roamer to buy a roaming plan to use those offers. For advertisers, the messaging platform provides an opportunity to attract a potentially high-spending customer base that cannot be reached via OTT advertisement platforms. Because the advertisement is sent to the roamer via SMS, the roamer can access the advertisement without using his or her data plan. Upon receipt of the advertisement via SMS, the roamer may be able add the offer provided in the advertisement to the mobile wallet without the need for any data plan.

The invention is a method of sending targeted SMS messages to a roamer. After a mobile device is turned on, the device must be first registered with a network. In doing so, the network becomes aware of the user's location which can change due to movement (mobility) of the user. Like all cellular networks, GSM or UMTS systems are radio networks of individual cells known as base stations. A base station covers a geographical area which is uniquely identified. For GSM, a base station is known as a base transceiver station (BTS). For UMTS, the base station is known as a Node B. Groupings of base stations are designated as location areas or routing areas. When the user moves into the area of a new cell, it may need to inform the network of this change by detecting location area codes (LAC). The LAC is broadcast by each base station at regular intervals. Within a location area, each base station is assigned a distinct cell identifiers (CI) number.

When idle, the mobile device measures the signal levels of the serving cell and of the neighboring cells. Neighboring cells are discoverable as their transmission frequency is announced on the broadcast channel (BCCH) of the serving cell. Values typically observed for that signal are −100 dBm which indicates a substantial distance from the base station and −60 dBm which indicates proximity to the base station. The signaling between the mobile device and the networks (home and visitor) enable approximations of the mobile device location without requiring mobile data services that provide location data such as GPS.

Figure 1:
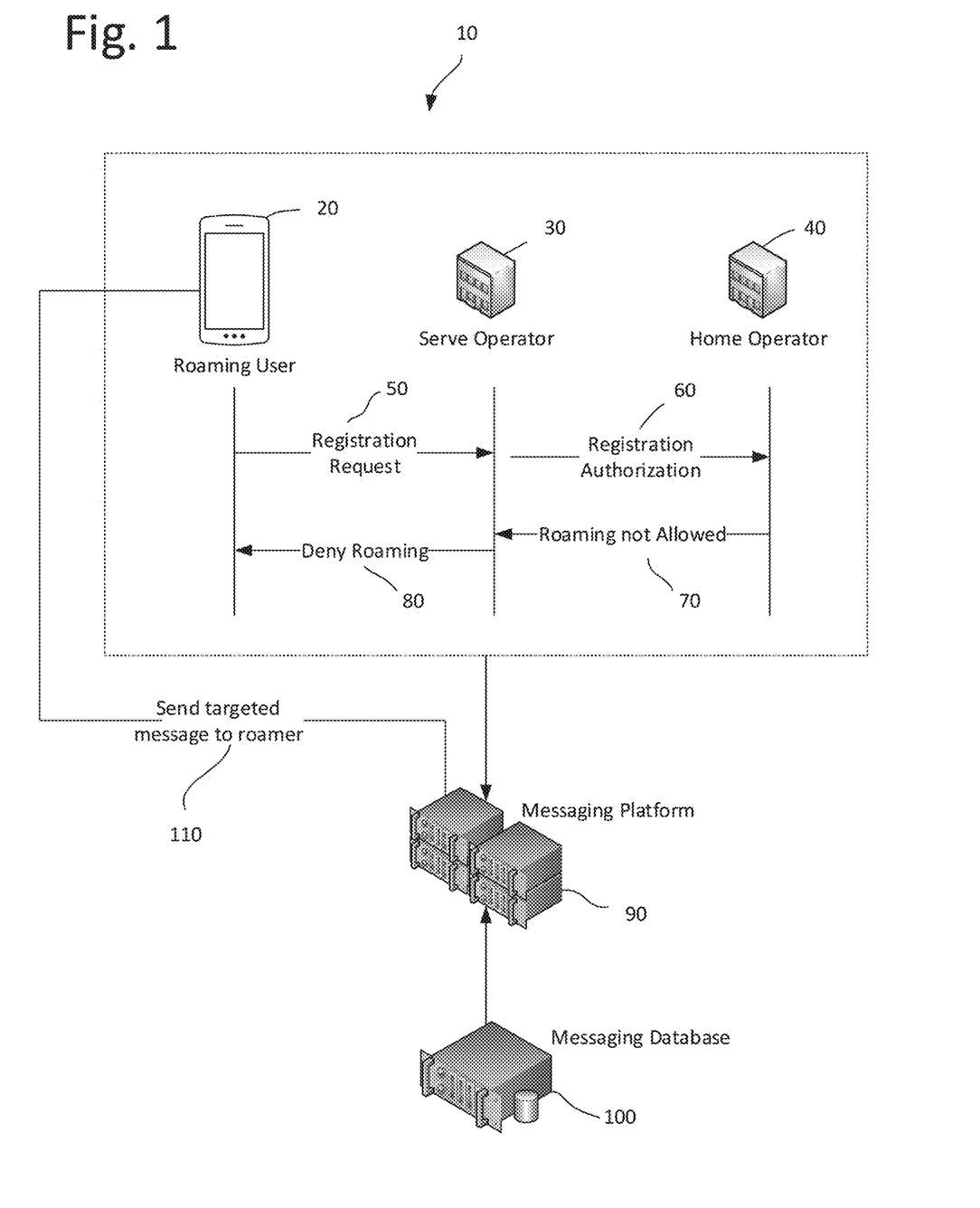
FIG. 1 is a schematic diagram depicting the architecture of the present invention.

Referring to FIG. 1, the invention involves a messaging platform having access to the operator roaming traffic. The mobile equipment (e.g., cellular phone) for roaming user 20 makes a registration request 50 to local serve operator 30. Registration authorization 60 is send to the home operator 40 (HLR) which returns a device preference for roaming user 20 that data roaming is not allowed 70. Serve operator 30 denies data roaming 80 to roaming user 20. Accordingly roaming user 20, unless connected to a local wireless network, typically does not have access to OTT applications that could otherwise convey useful and pertinent advertising based on location and preferences. However, the instant invention has access to signaling between serve operator 30 and home operator 40. Accordingly, roaming user's location can be determined and targeted messages may be sent to roamer 110 from a messaging platform 90 communicatively coupled to a messaging database 100.

Figure 2:
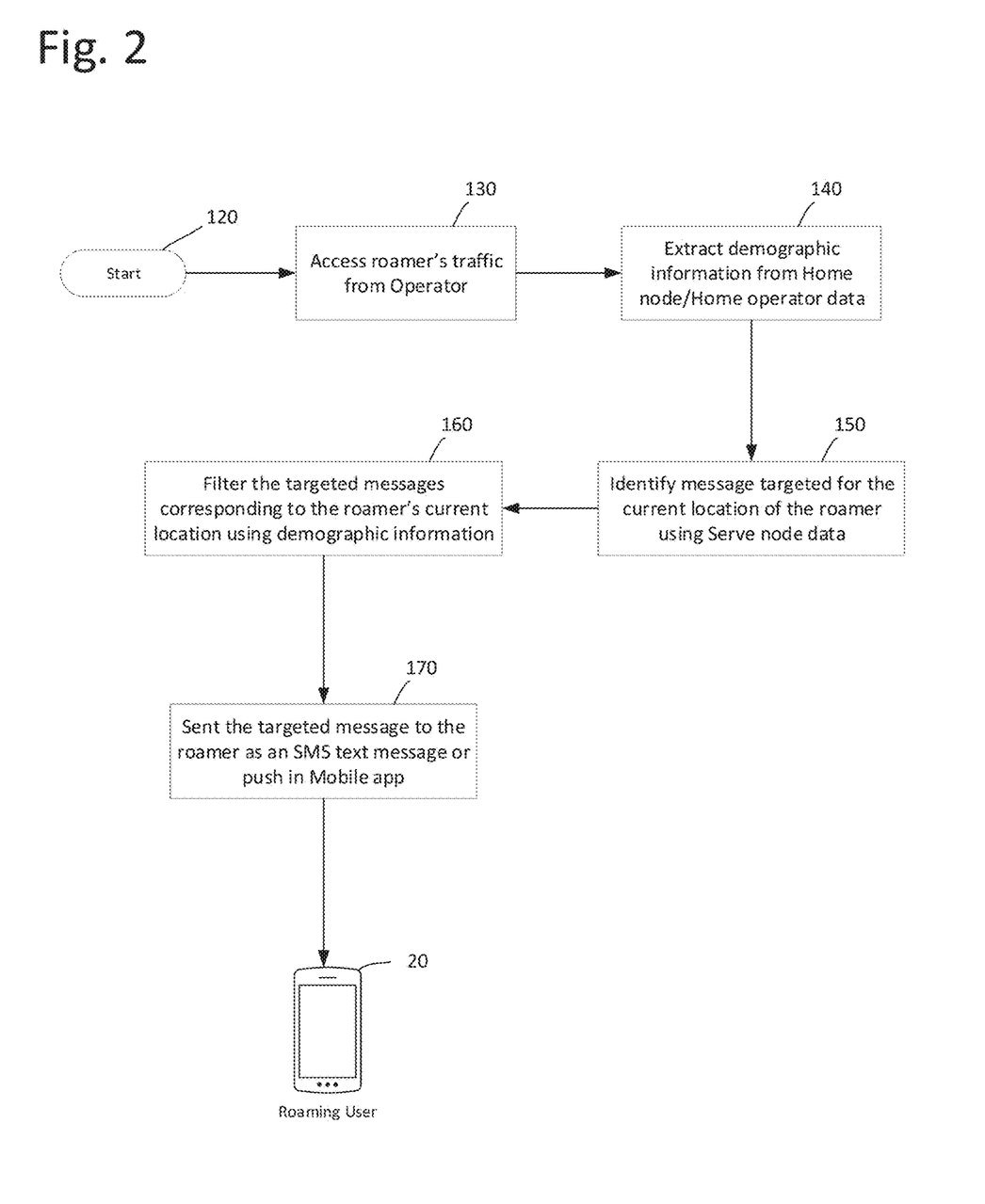
FIG. 2 is a flow chart depicting the functionality of the messaging platform according to an embodiment of the invention.

Referring to FIG. 2, when the roamer registers onto a visited network 120, the messaging platform collects 130 roamer's traffic from the visited network. The messaging platform extracts roamer's demographic information 140 from the roamer's Home node, for example the user's home country. The messaging platform also extracts the user's current location using the Serve node data of the visited network. The extracted information provides at least two important pieces of information about the roamer: where the roamer is from and the roamer's current location. The messaging platform uses this information to send a targeted SMS message to the user. This is done by identifying one or more messages targeted for the current location of roaming user using serve node data 150. This may include a multitude of products and services such as restaurants, hotels, rental vehicles, or even roaming data plans. The targeted message is then sent 170 to roaming user 20 as a SMS text message.

In an embodiment, the messaging platform can send targeted advertisements to the roamer via SMS. As depicted in FIG. 1, the messaging platform has access to the operator roaming traffic, and, therefore, the messaging platform can extract information about the user's current and home locations. The messaging platform also has access to the database of subscribed advertisers. As shown in FIG. 2, after the messaging platform extracts the information from the roamer's Home node and Serve node, the messaging platform pulls the advertising data from the advertiser database. The advertising database can be queried based on user's current location to identify advertisements associated with the roamer's current geographic location. For example, if the roamer is currently roaming in Tampa, Fla., then the messaging platform will query the advertising database for advertisements associated with this location—such as, restaurants located in Tampa.

Figure 3:
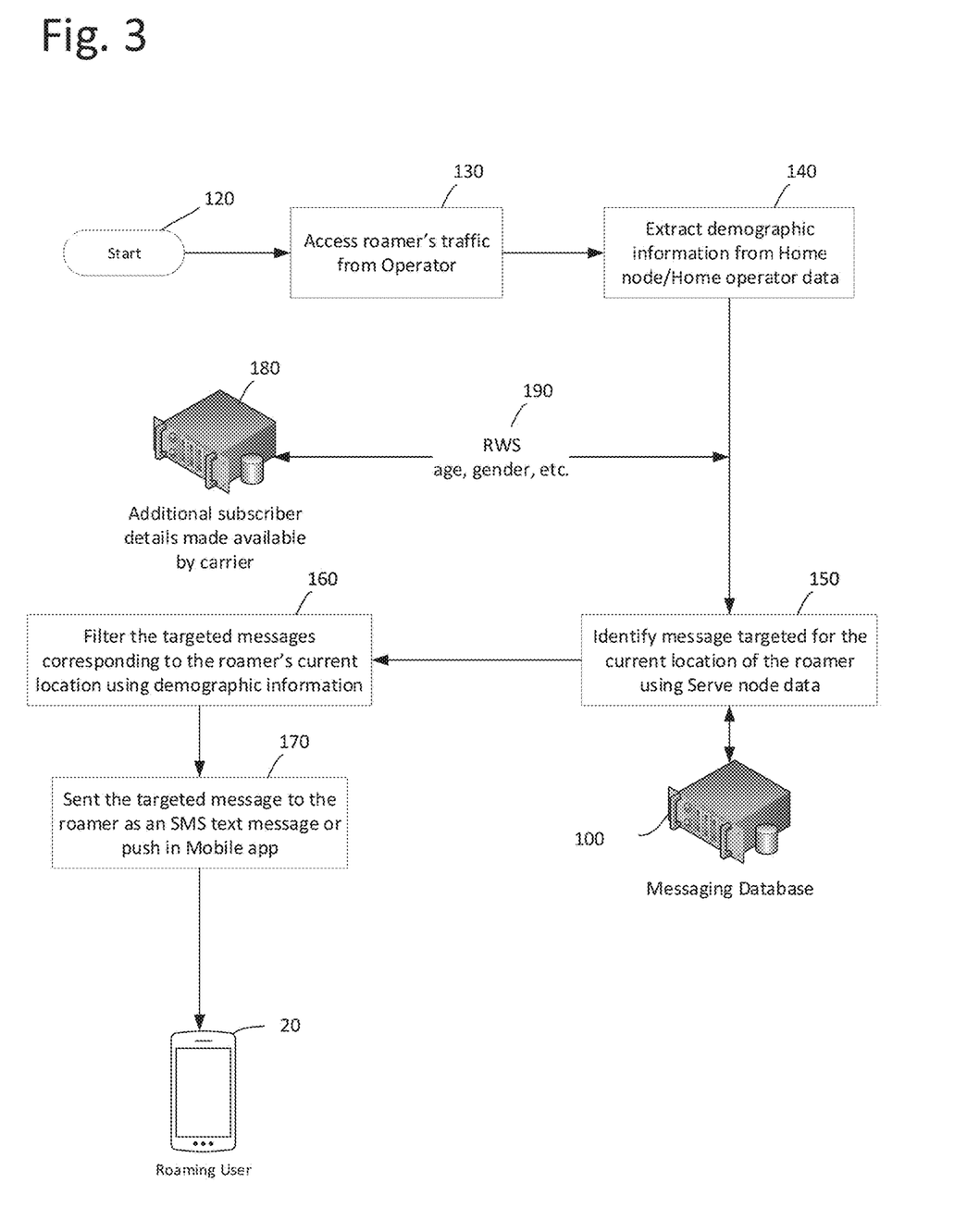
FIG. 3 is a flow chart depicting the functionality of the messaging platform according to an embodiment of the invention including a remote web server request for additional roaming user details.
Figure 4:
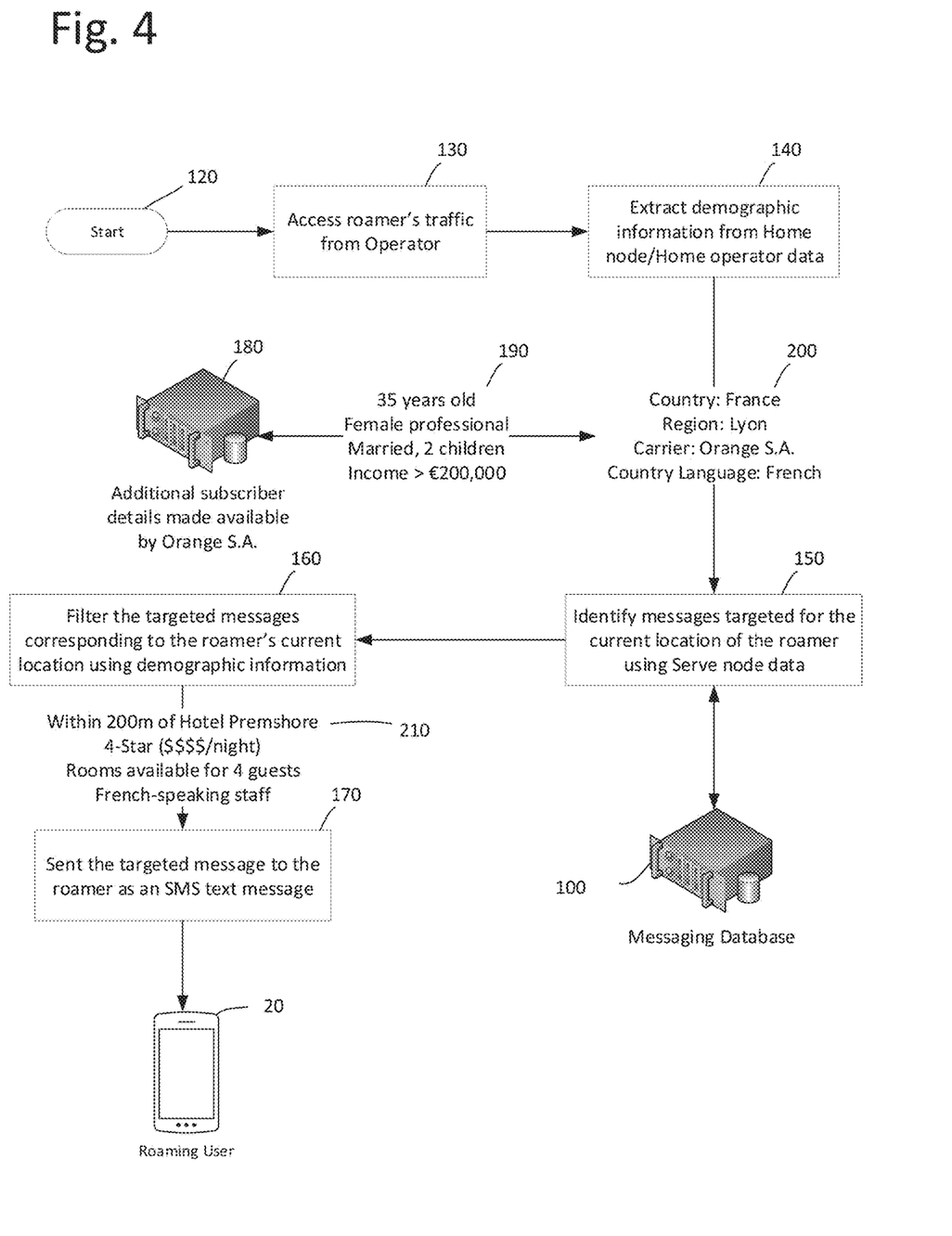
FIG. 4 is a flow chart depicting the functionality of the messaging platform according to an embodiment of the invention enumerating illustrative values.

FIG. 3 shows another embodiment of the invention where the home carrier for roaming user 20 provides a remote web service platform to supplement roaming user 20 preferences and information stored in web service database 180. Providing more detailed information on roaming user 20 allowed targeted advertising by SMS to be precise and pertinent to roaming user 20. FIG. 4 shows a first data array 200 on roaming user 20 provided by the HLR (home network) which includes country, region, carrier and (from the country/region data) the likely native language. Remote web service database 180 provides additional details permitted by roaming user 20 to be shared by its carrier. This additional array of data 190 includes the roaming user's age, gender, occupational level, marriage status, children and income level. Accordingly, with additional demographic data on roaming user 20, targeted message 170 can be more accurately filtered 160. In the example of FIG. 4, it pushed an SMS message regarding a nearby hotel with staff that speak the same presumed native language based on the home node 140 data 200.

Figure 5:
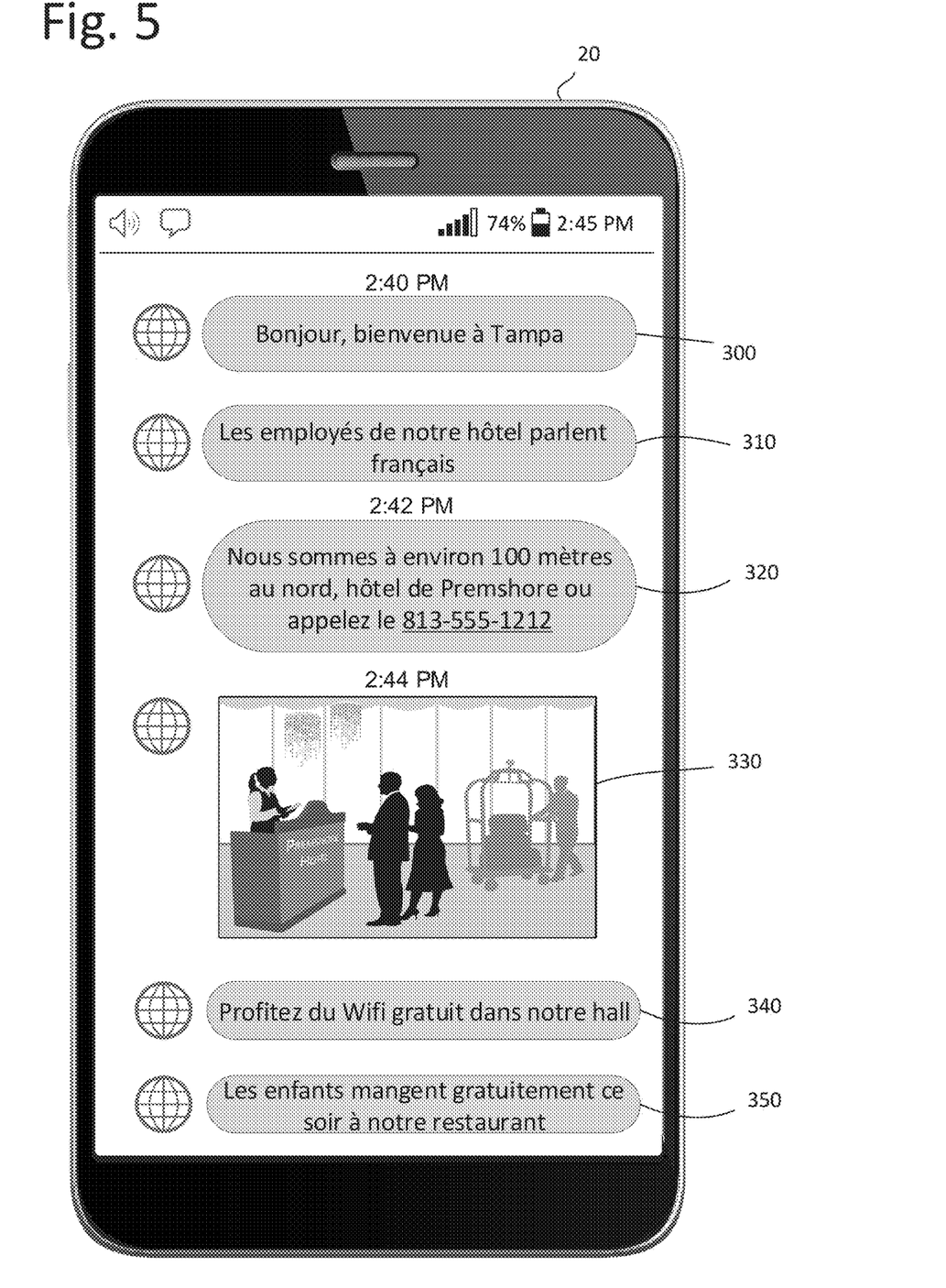
FIG. 5 is an illustrative drawing depicting a sample targeted messaged delivered to a roamer via SMS in the assumed, native language of the home network.

FIG. 5 is an illustrative view of the mobile user interface of roaming user 20 wherein the messages are translated to French to welcome 300 the roaming user to Tampa, advise that the hotel has staff that speak French 310, note that the hotel's location is 100 meters north and provides the phone number for the hotel 320, sends a MMS image of the hotel lobby 330, offers free wireless Internet 340 and advises that children eat free at the hotel's restaurant 350.

Figure 6:
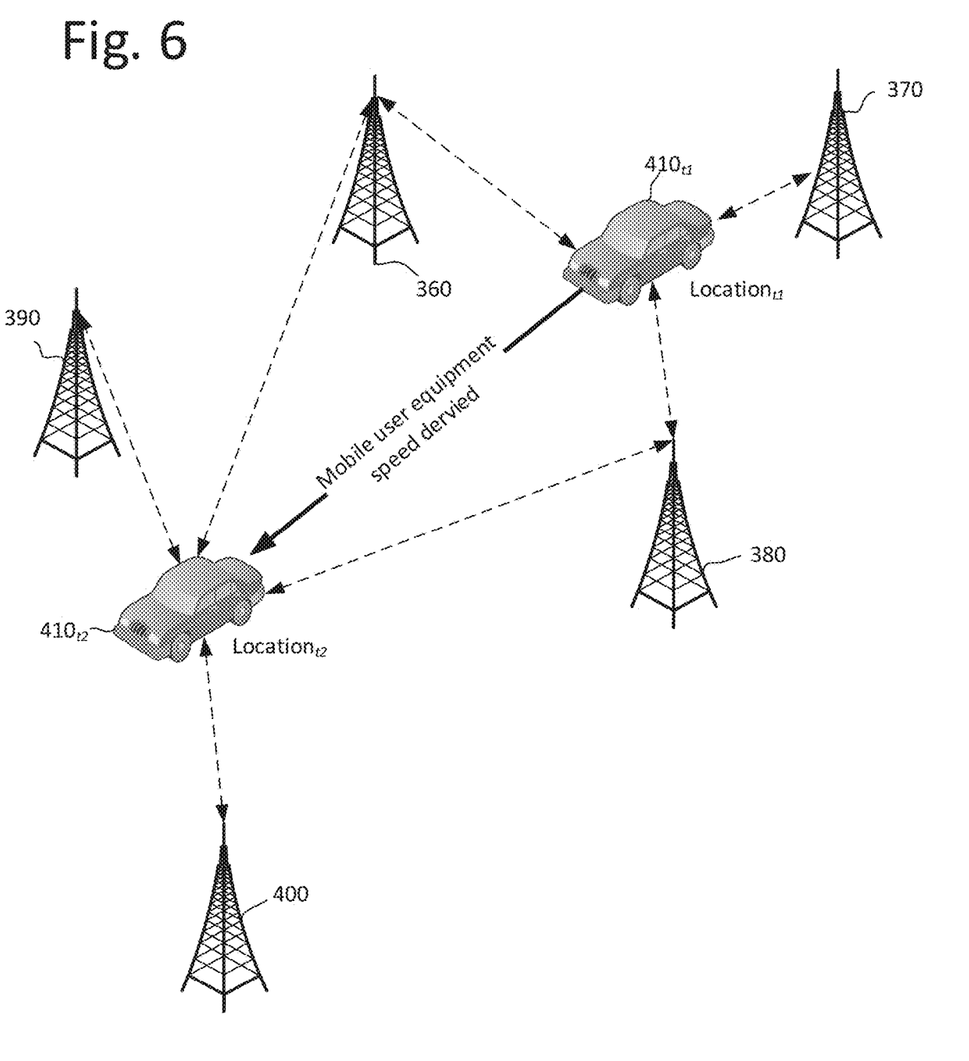
FIG. 6 is a diagrammatic view of an embodiment of the invention determining mobile user movement and speed through cell tower triangulation.

In FIG. 6, roaming user 20 is riding in vehicle 410. Triangulation (or other signaling-extracted means) of the location of roaming user 20 takes place at two points in time, $t_1$ and again at $t_2$ via cell towers 360, 370, 380, 390 and 400. From the triangulated locations over time, the speed of roaming user 20 can be inferred. This is important for targeting messages. Roaming users walking within a city should receive targeted messages that advertise services in closer proximity than roaming users traveling in a vehicle. For example, an individual walking is traveling at 2-3 miles per hour. From 10-15 miles per hour, the roaming user may be on a bicycle or scooter. Greater than 30 miles per hour, the user may be on a bus, car or train. As the roaming user's speed increases, the radius of accessibility to products and services increases. Therefore, the targeting of the SMS based on user location will depend on how fast the user is traveling, how much time it would take for them to arrive at the targeted advertiser and how close they are currently to the targeted advertiser.

Figure 7:
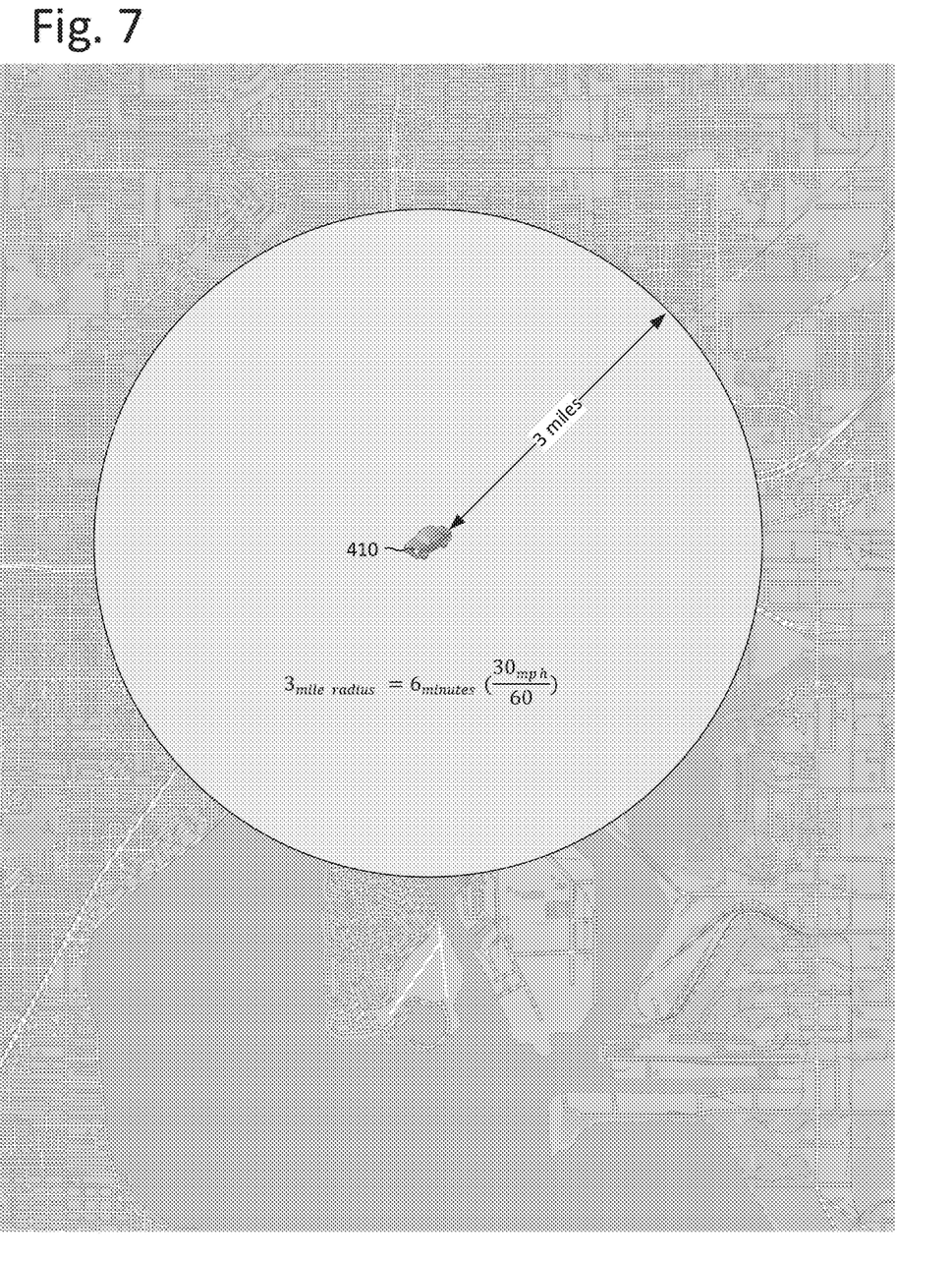
FIG. 7 is an illustrative view of a 6-minute radius of accessibility for a roaming user traveling 30 miles per hour.
Figure 8:
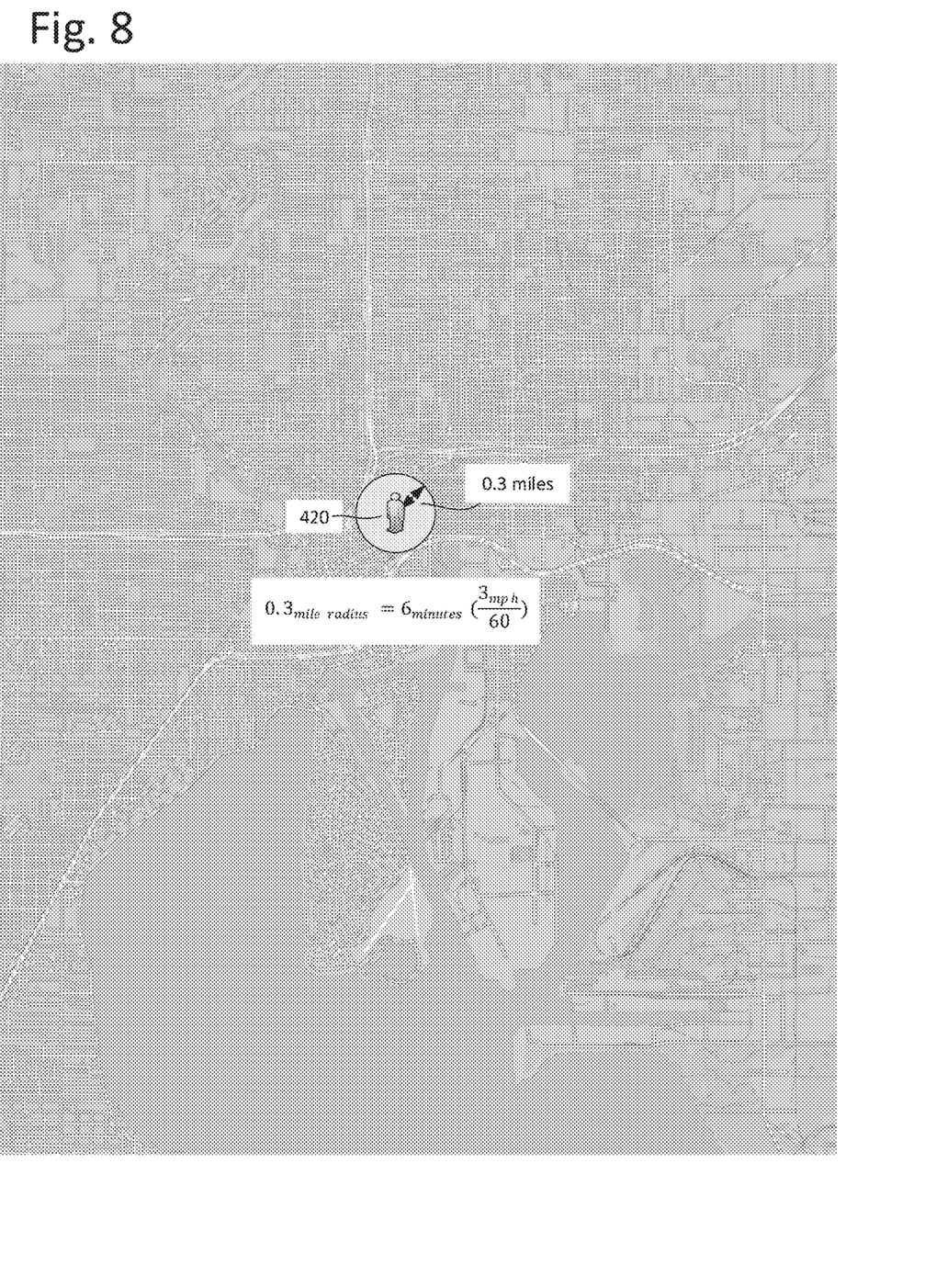
FIG. 8 is an illustrative view of a 6-minute radius of accessibility for a roaming user traveling 3 miles per hour.

In FIG. 7, roaming user 20 is traveling in vehicle 410 at 30 miles per hour. Advertiser believes that an appropriate window of opportunity for bringing roaming user in is 6 minutes. Therefore, the radius of accessibility to advertiser is 3 miles. An embodiment of this invention retrieves these constants and applies the variables of roaming user's location, movement, speed and demographics to determine whether or not a targeted SMS advertisement should be transmitted. FIG. 8, shows, by contrast, roaming user 20 walking 3 miles per hour on a 6-minute window of opportunity reduces the radius of accessibility to 0.3 miles. The roaming user traveling at a slower speed has a smaller target area for pertinent advertising within a timeframe.

Figure 9:
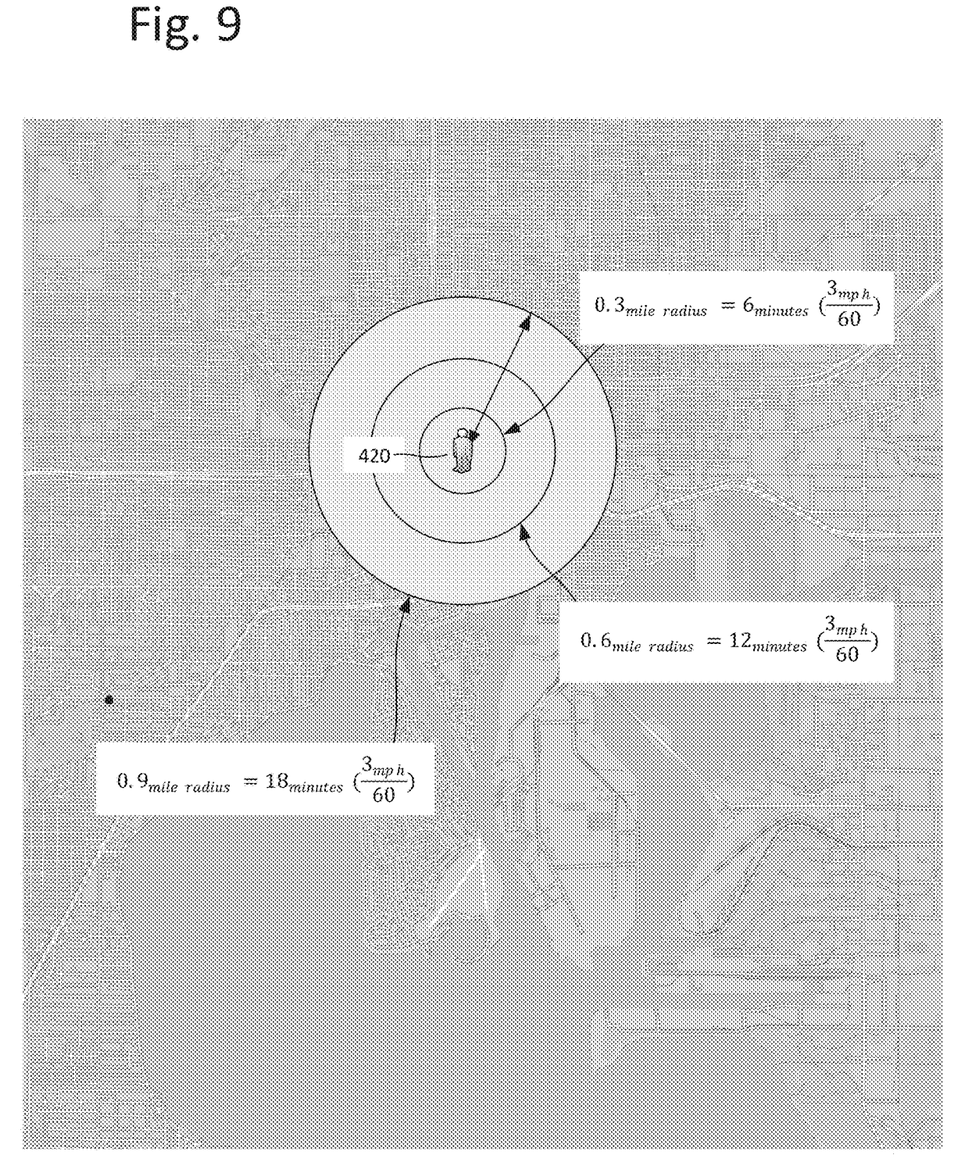
FIG. 9 is an illustrative view of radiuses of accessibility for a roaming user traveling 3 miles per hour based on various windows of time.

It should be noted that the window of opportunity is not fixed at 6 minutes. As shown in FIG. 9, depending on the forecast and preferences of the advertising entity for the targeted SMS, an increase in the timeframe from 6 minutes to 12 minutes and then again to 18 minutes changes the radius of accessibility to 0.6 and 0.9 miles respectively.

Figure 10:
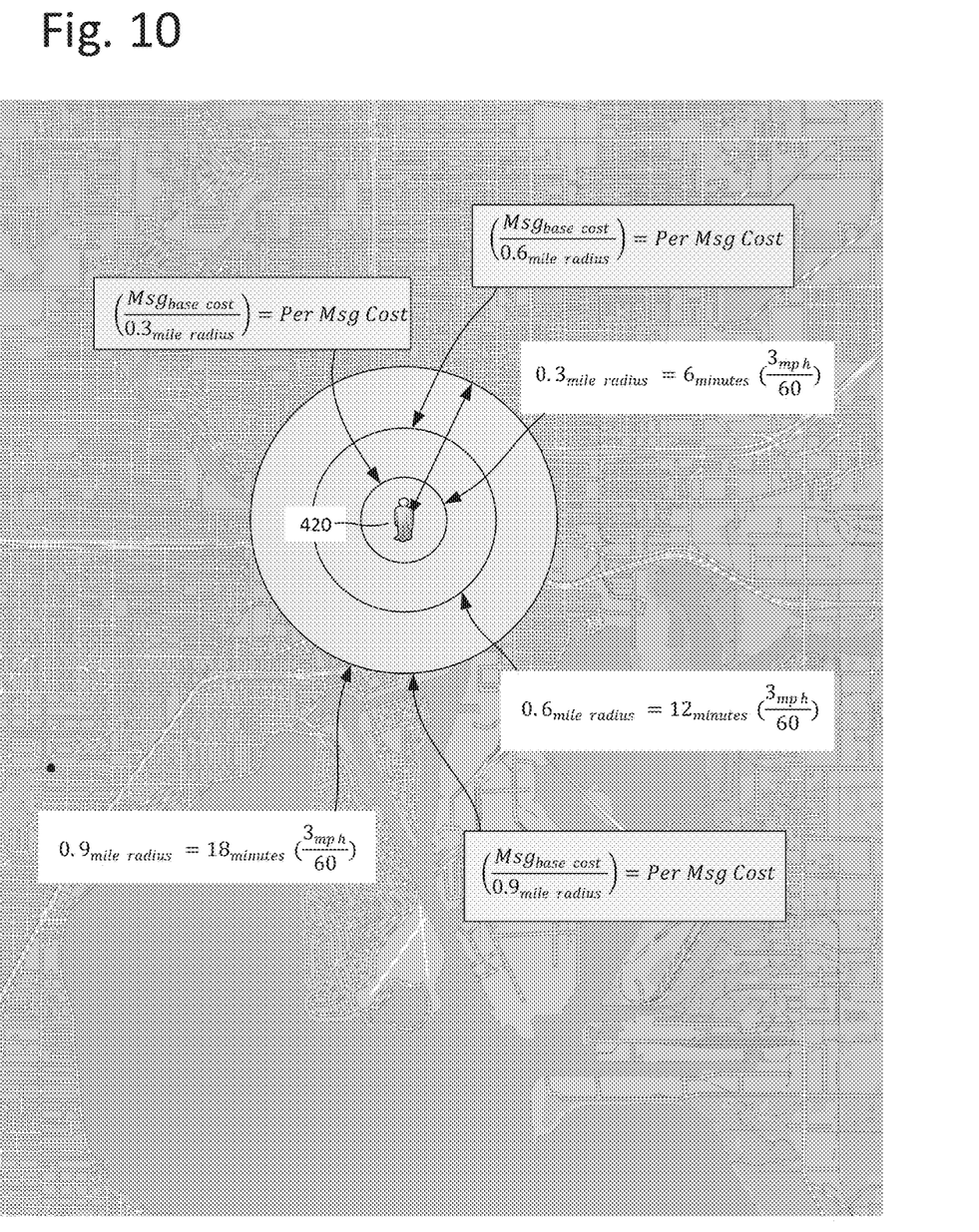
FIG. 10 is an illustrative view of a targeted SMS message pricing scale based on radius of accessibility according to an embodiment of the invention.

In FIG. 10, another embodiment of the invention is shown where in the cost per SMS message is variable based not solely on the proximity of roaming user 20 to the advertiser's location, but also (or alternatively) on the radius of accessibility. Roaming user 20 traveling in a vehicle at 30-60 miles per hour has greater accessibility to more distant advertisers than those walking the city. In the example in FIG. 10, the cost per message is inversely related to the length of the radius of accessibility which is distinct from fixed proximity at a single point in time (generally in real-time for OTT applications which roaming user 20 has turned off).

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Network infrastructure and systems may include circuit-switched data transmissions over GSM, packet-switched data transmissions over GPRS, enhanced data rates for GSM evolution (EDGE) and long term evolution (LTE)/LTE-Advanced Pro.

Glossary of Terms

Accessibility Radius means the geographic distance to a location that a roaming user can reasonably get to within a predefined period of time (See Window of Opportunity) based on the speed of movement of the roaming user determined by cellular radio signaling between the roaming user and base stations within the visiting network.

Advanced Forward Link Trilateration determines mobile device location by taking measurements of signals from nearby cellular base stations (towers) and reports the time/distance readings back to the network.

Data Service means the IP-based, non-voice data on a mobile device used for mobile apps, multimedia messaging, streaming services and the like.

Demographic Information means statistical characteristics of human populations such as age, income, sex, and other information particularly useful to identify markets and consumer preferences.

Home Network means the network to which the mobile device subscriber is registered with.

Local Data Services means wireless local area networking based on the IEEE 802.11 family of standards, commonly known under the WWI trademark.

Roaming refers to a mobile device being used outside the range of its home network and connects to another available network.

Mobile Equipment means a cellular phone that makes voice calls and SMS messaging through GSM or CDMA technologies.

Multilateration is a mobile device location technique based on the measurement of the times of arrival of radio waves having a known propagation speed.

Multimedia Messaging Service (MMS) is built using the same technology as SMS to allow transmission of multimedia content over a cellular network. MMS is considered an extension of SMS.

Over the Top (OTT) are messaging applications that use internet protocols (IP). These applications require an Internet connection such as WiFi or a mobile Internet connection. Examples of OTT application include those under the brands IMESSAGE, WHATSAPP, SNAPCHAT and FACEBOOK MESSENGER.

Representational State Transfer (REST) is a software paradigm of constrains used for web services. RESTful Web services (RWS) enable interoperability between computer system on the Internet. In a RESTful Web service, requests made to a resource's uniform resource locator (URI) will elicit a response with a payload formatted in HTML, XML, JSON, or some other format. RESTful Web services are included in an embodiment of the invention to transmit additional demographic details about a roaming user over the standard data points conveyed by the HLR.

Silent Roamer means a mobile phone user that maintains an active cellular connection but has turned off data services (typically due to cost concerns). Accordingly, they are reachable through SMS but not through OTT messaging.

SMS (or short message service) is a text messaging service component primarily for mobile devices. Messages are typically limited to 160 characters but may be chained together.

Triangulation is a mobile device location technique based on measuring power levels and antenna patterns of cell towers on a network.

Visitor Network means the network on which a subscriber roams temporarily and is outside the "Home Network."

Window of Opportunity means a time value in minutes associated with a particular product or service. By way of example, travel to a destination theme park is a consideration that is general given greater thought and advanced planning. Therefore, the window of opportunity value would be greater than a service of more immediate need just as a nearby fast food restaurant.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of sending a targeted short messaging service (SMS) message to a user operating a mobile device as a silent roamer, the method comprising:
   accessing signaling traffic between the mobile device, a visited network operator, and a home network operator;
   obtaining the user's location from the signaling traffic with the visited network operator at a first point in time;
   obtaining the user's location from the signaling traffic with the visited network operator at a second point in time;
   extrapolating from the two points in time, the speed in which the user is moving;
   setting a length of time for a window of opportunity in which a targeted SMS message remains pertinent to the user based on a product or service provided at a fixed location;
   deriving an accessibility radius from the length of time and speed of movement of the user wherein the accessibility radius is a distance from the current location of the user as determined from the signaling traffic that can be traveled at the user's speed of movement; and
   automatically filtering messages in a messaging database and sending only those targeted SMS messages offering the product or service at the fixed location within the accessibility radius to the user operating the mobile device.

2. The method of claim 1 wherein a transaction fee for the transmission of the targeted SMS message is partially or directly inversely proportional to the window of opportunity time value.

3. The method of claim 1 wherein a transaction fee for the transmission of the targeted SMS message is partially or directly inversely proportional to the accessibility radius value.

4. The method of claim 1 wherein the signaling traffic with the visited network operator derives the user's current location by a method selected from the group consisting of multilateration, triangulation and advanced forward link trilateration.

5. The method of claim 4 further comprising the steps of:
   obtaining demographic information derived from the user's home network, the demographic information includes data values selected from the group consisting of primary language spoken, country of origin, and region of origin; and
   incorporating the demographic information into the targeted SMS message.

6. The method of claim 1 wherein the targeted SMS message is a third-party advertisement.

7. The method of claim 1 wherein the targeted SMS message is an offer for roaming data services.

8. The method of claim 1, wherein the targeted message is an offer for local data services.

9. The method of claim 1, wherein the targeted message includes a multimedia component selected from the group consisting of video, images and audio.

* * * * *